March 18, 1924.
J. EATON
1,487,320
SYSTEM OF SELECTIVE CONTROL
Filed Jan. 4, 1922
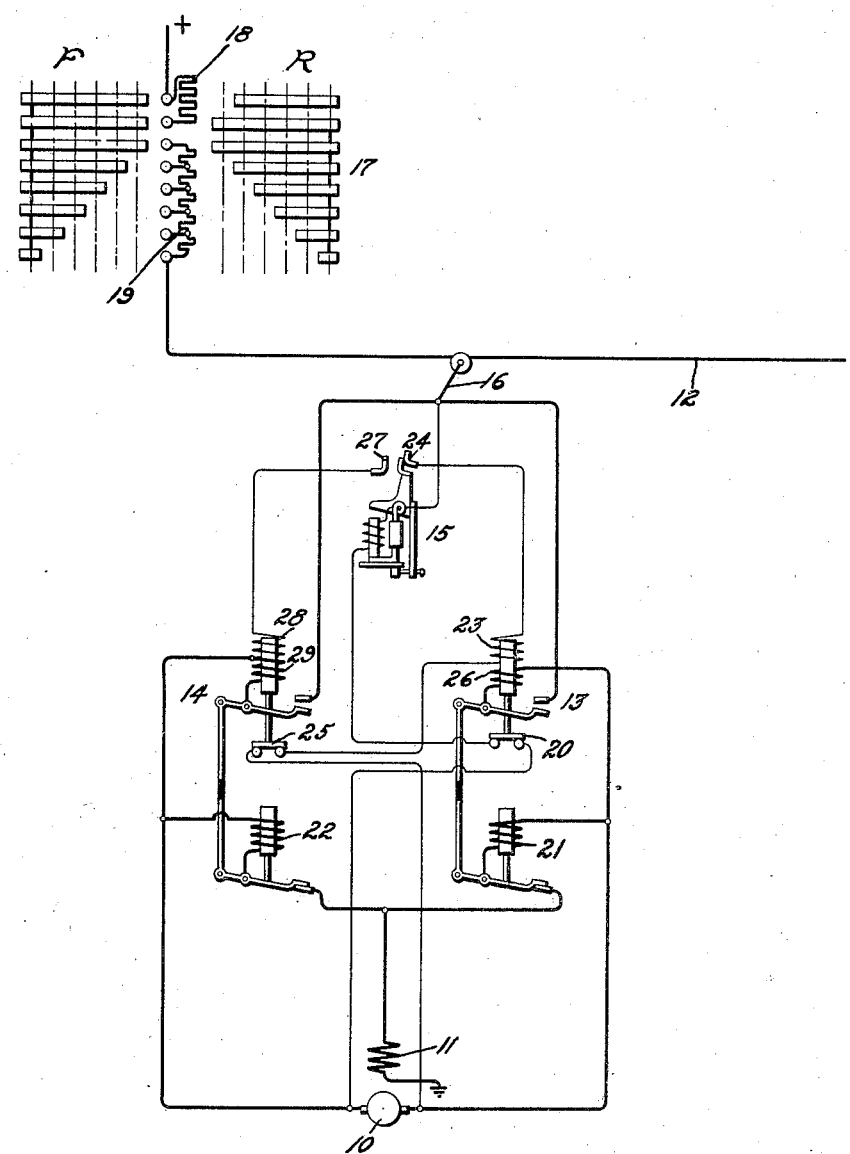
Inventor:
John Eaton Patented Mar. 18, 1924.

1,487,320

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

SYSTEM OF SELECTIVE CONTROL.

Application filed January 4, 1922. Serial No. 526,983.

*To all whom it may concern:*

Be it known that I, JOHN EATON, a subject of the British Empire, residing at Schenectady, county of Schenectady, State of New York, have invented certain new and useful Improvements in Systems of Selective Control, of which the following is a specification.

My invention relates to an improved selective control system whereby any desired portion of a plurality of separate paths from a supply conductor may be selected and closed at will.

The invention has a particular application in the control of the direction of operation of an electric vehicle from a point remote from the vehicle, although the invention is not necessarily limited to such use.

One of the objects of the invention is to provide an arrangement whereby any desired portion of a plurality of separate paths for the current from a single supply conductor may be selected at will by controlling the potential of the conductor.

In carrying the invention into effect, I provide electro-responsive switch mechanism for establishing the selected portion of the paths for the current from the supply conductor and control the said switch mechanism by means of an electro-responsive means under the control of the potential of the supply conductor. Where the invention is used to control an electric vehicle at a remote point, the electro-responsive switch mechanism is mounted on the vehicle and is used to reverse the driving motor connection to thereby reverse the direction of operation of the vehicle. The electro-responsive selective means may comprise a relay which controls the reversing switch mechanism. This relay may also be mounted on the vehicle and may be provided with means whereby its operation may be under the control of the potential of the trolley wire supply conductor and the potential of the trolley wire may be controlled at a remote point by any suitable means such as a reversing controller. Thus, assume that the electric vehicle is at a remote point and it is desired to operate the vehicle either forward or reverse. The reversing controller located at the station of the operator is operated in one direction to include a resistor in the circuit of the trolley wire in case one direction of vehicle operation is desired, or the controller is operated in the opposite direction to exclude the resistor so as to cause the vehicle to operate in the reverse direction.

The electro-responsive relay is preferably of the well known "series" lock-out type, the broad general features of which are fully disclosed in the patent to Lum No. 1,339,466, dated May 11, 1920, and also the patent to Canfield No. 1,344,260, dated June 22, 1920. This relay has its winding normally connected to the trolley wire, so that in case the potential of the trolley wire is above a certain value, the current through the relay winding is such that the relay is magnetically locked in its normal position and the electro-responsive reversing switch mechanism is energized through the relay contacts to connect the vehicle motor to the trolley wire for one direction of operation, but in case the potential of the trolley wire is less than the predetermined value, the relay is magnetically operated to energize the electro-responsive reversing switch mechanism for the other direction of vehicle operation. The reversing controller may also be used to control the speed of operation of the vehicle after the direction of operation has been selected by controlling an accelerating resistor in series with the trolley wire. The direction and speed of operation of the vehicle is thus controlled from a remote point, so that it is not necessary for an operator to ride on the vehicle as is the customary practice.

For a better understanding of my invention, reference is had to the accompanying drawing wherein I have illustrated in very simplified form a selective motor control system which embodies my invention in the control of electric vehicles at a point remote from the vehicle.

Referring to the drawing, the electric vehicle has not been shown, since that would add nothing to an understanding of the invention. It is intended that the electric vehicle shall be operated back and forth along a track (not shown) by means of the electric motor having an armature 10 and a series field 11. This electric motor is energized from the single trolley wire supply conductor 12 for one or the other direction of operation in response to the operation of the electromagnetic reversing switch mechanism which comprises the double pole electromagnetic switch mechanism or contactor 13 for forward operation and the double pole electromagnetic switch mechanism or contactor 14 for reverse operation.

The electro-responsive relay 15 is provided for selectively controlling the energization of the electro-responsive reversing switch mechanism 13 and 14. This relay is preferably of the well known "series" magnetic lock-out type which is arranged to be magnetically held in its biased position when the current through the relay winding is above a predetermined value and to be magnetically operated to and be magnetically held in a second position when the current through the relay winding is below a predetermined value. The series relay 15 shown on the drawing is a diagrammatic representation of the particular type of magnetic lockout switch which is fully described in the patent to Edwin J. Murphy No. 1,352,307, dated December 7, 1920. This particular type of "series" magnetic lockout type of switch has been selected for the purpose of giving an understanding of the principles of the invention, but I would have it understood that my invention is not necessarily limited to this particular type of magnetic lockout switch. The winding of the relay 15 is normally connected to the supply conductor 12, so that the current through the relay winding is directly responsive to the potential of the supply conductor.

The trolley 16 for the motor vehicle (not shown) is normally in engagement with the trolley wire supply conductor 12. The electric motor, the electromagnetic reversing switch mechanism, the relay 15 and the trolley 16, together with the electrical connections between these parts, will all be suitably mounted on the electric vehicle which is to be controlled at a remote point.

The reversing controller 17 is provided for connecting the trolley wire 12 to the source of supply indicated by the plus sign and to control the initial potential of the supply conductor so as to control the selective operation of the selector relay 15. The reversing controller 17 is also provided for controlling the acceleration and the speed of operation of the vehicle driving motor. The resistor 18 of a comparatively high value is adapted to be included in the circuit of the supply conductor when the reversing controller is thrown from its off position to the left for effecting a reversing operation of the motor vehicle. This resistor is short circuited and excluded from the circuit of the supply conductor when the controller is thrown from the off position to the right so as to select for forward operation of the motor vehicle. The accelerating and speed controlling variable resistor 19 is provided for regulating the current in the supply conductor and the current taken by the vehicle driving motor after the selective relay 15 has operated to energize the electromagnetic reversing switch mechanism 13 or 14 for the particular direction of motor vehicle operation desired.

As thus constructed and arranged, and with the parts in the various positions shown in the drawing, if it is desired to operate the motor vehicle in the forward direction, the reversing controller 17 is turned from its off position toward the right to its first operative position. The high resistance selector resistor 18 is thereby short circuited and substantially the full voltage of the source of supply is applied to the trolley wire 12. It will be observed that the winding of the relay 15 is energized from the trolley wire through a circuit including the trolley 16, the auxiliary switch 20 associated with the forward direction contactor 13 through the multiple paths including the series winding 21 and the series winding 22 in the other path through the series field winding 11 of the motor to the return conductor, which is indicated as a ground connection. Because of the fact that substantially full line potential is applied to the trolley wire 12, the current through the winding of the selector relay 15 will be such that the relay will be magnetically locked in its biased position, that in which the winding of the direction contactor 13 is energized from the supply conductor. This relay is designed so as to be very quickly responsive to the potential of the trolley wire, but in this case, since the trolley wire is at substantially full source of supply potential, the shunt winding 23 of the contactor 13 will be energized from the supply conductor 12 through a circuit including the trolley 16, the switch member of the relay, right-hand relay contact 24, through the auxiliary switch 25 associated with the other direction contactor 14 to the ground return through the motor series field 11. The contactor 13 will thereby be energized to close and establish one path for the motor current for the forward direction of operation.

The closing of the contactor 13 energizes the vehicle motor through a path for the current including the variable acceleration and speed controlling resistor 19, the trolley wire 12, trolley 16, upper contacts of the double-pole direction contactor 13, through the series winding 26 of this contactor, through the motor armature and through the series winding 22 associated with the lower contacts of the double-pole direction contactor 14, and then through the motor series field 11 to the ground return. The closing of the contactor 13 will open the lower contacts associated with this contactor, and the direction contactor 13 will be maintained closed by means of the series coil 26 despite vibrations of the relay 15 which would temporarily interrupt the circuit through the right-hand contact 24. The upper contacts of the other direction contactor 14 will be maintained open and the lower contacts of this contactor will be magnetically held closed by means of the winding 22 which is included in the motor circuit. Further, when the contactor 13 closes, the auxiliary switch 20 opens to deenergize the winding of the selector relay 15, so that this relay may not carry a current for this direction of operation after the relay has operated.

In order to accelerate the motor, the controller 17 will be advanced through its successive operative positions toward the right to thereby short circuit step by step the sections of the accelerating and speed regulating resistor 19. In order to stop the vehicle at the desired point in the forward direction, the controller 17 will be returned to its off position, including the motor armature in a local dynamic brake circuit including the lower contacts of the direction contactors 13 and 14.

Assume that it is now desired to operate the vehicle in the reverse or return direction, the controller 17 will be advanced from the off position toward the left to its first operative position, thereby including the comparatively high resistance selector resistor 18 in series with the supply conductor 12, so that the voltage of this supply conductor is materially less than the voltage of the source of supply. It will be understood that the winding of the relay 15 is normally connected to the supply conductor with the direction contactors open, so that a materially smaller current will now flow through the relay winding than was the case for forward vehicle operation. This relay will thereupon be magnetically operated to bring its contact member into engagement with the left-hand relay contact 27, and the winding of the relay will magnetically hold the contact members of the relay into engagement with this contact 27. The voltage of the supply conductor with the resistor 18 in circuit therewith is below the value at which the shunt winding 23 of the forward direction contactor 13 will be energized to close the contactor 13, and furthermore the relay 15 is designed so as to be quickly operated to thereby prevent the unintentional energization of the forward direction contactor when it is desired that the reverse direction contactor 14 be energized to close.

With the contact member of the relay in engagement with the left-hand relay contact 27, the relay is in position to energize the shunt winding 28 of contactor 14 when the controller 17 is advanced toward the left to its second operative position at which the selector resistor 18 is short circuited, thereby applying full supply circuit potential to the trolley wire 12 and energizing the shunt winding 28 of the reverse direction contactor 14 through a circuit including the trolley wire 12, trolley 16, switch member of the relay 15, contact 27, to the ground return through a circuit previously traced. The increased potential applied to the trolley wire 12 after the relay 15 has operated to make engagement with the contact 27 will not cause this relay to return to its normal position in engagement with the relay contact 24, because of the fact that the relay will be magnetically held in the operated position after it has been operated to that position. The closing of the upper contacts of the contactor 14 will energize the motor through a circuit including the variable accelerating and speed controlling resistor 19, trolley wire 12, trolley 16, upper contacts of the contactor 14, through the series winding 29 of this contactor, through the motor armature in a direction the reverse of that previously established, through the winding 21 associated with the lower contacts of the contactor 13 and the series field 11 of the motor. After the contactor 14 is energized to close, it will be maintained in the closed position by means of the series winding 29, and the upper contacts of the contactor 13 will be maintained in their open position by means of the winding 21 associated with the lower contacts of this contactor. The established circuit through the motor is thus maintained despite the vibrations of the relay 15, which would tend to open the circuit through the shunt winding 28 of the contactor 14. The closing of the contactor 14 causes the auxiliary switch 25 associated therewith to open and thereby open a circuit for the contactor 13 to prevent the energization of this contactor when the contactor 14 is closed.

It will be observed that my arrangement has obvious features of simplicity, for the reason that the control of the selection of the particular desired portion of the paths for the current from the single supply conductor is effected by means of a controller 17 which may be located at a point remote from the vehicle, and that after the particular path for the current has been selected and the direction of motor vehicle operation thus selected, the speed of operation of the vehicle may be controlled by means of the same controller which governs the selection. The current which effects the desired selection and the current for operating the vehicle are all transmitted through the single supply conductor. The arrangement is such that the potential of the supply conductor is varied but never reversed. Assume that the potential of the source of supply is 250 volts. A typical arrangement which would operate in accordance with my invention may be designed as follows: The resistor 18 may be of such a value that when included in series with the supply conductor 12, the resistor will limit the voltage of the supply conductor to such a value that the voltage drop across the switch contacts of the electro-responsive switch mechanism 13 and 14 is 125 volts. The current which will pass through the winding of the "series" lock-out type selector relay 15 with a voltage of 125 applied to the winding thereof will be such that the relay will magnetically operate to make engagement through the left-hand contact 27 so as to energize the shunt winding 28 of the direction contactor 14. However, in case substantially full supply circuit voltage is applied to the supply conductor 12, as would be the case when the controller 17 is turned from the off position toward the right, the selector relay 15 will be energized so as to be magnetically held in its normal position, that shown in the drawings. The direction contactors 13 and 14 may be designed so that for a 250 volt source of supply, the contactors will not be energized to close at a potential of less than 230 volts applied to the windings thereof. The direction contactors are thereby prevented from being energized to close until substantially the full source of supply potential is applied thereto.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is:—

1. The combination in a system of control of a supply conductor, switch contact mechanism for selecting a desired portion of a plurality of paths for the current from the said conductor, and electroresponsive means connected to be energized from the said conductor for magnetically holding the said switch mechanism in a position to select a portion of the said paths when the initial potential of the said conductor is a predetermined value and for magnetically operating the said switch mechanism to select another portion of the said paths when the initial potential of the said conductor is a different value.

2. The combination in a system of control of a supply conductor, a switch member for selecting either of two paths for the current from said conductor, and electromagnetic means energized from the said conductor for magnetically holding the said switch member in a position to select one of said paths and magnetically preventing the operation of the said switch member to select the other of the said paths when the potential of the said conductor is above a predetermined value, and for magnetically operating the said switch member to select the said other path when the potential of the said conductor is below a predetermined value.

3. The combination in a system of control of a supply conductor, electro-responsive switch mechanism for establishing a selected portion of a plurality of paths from the said conductor, switch contact mechanism for selecting the desired portion of said paths, and means operated responsively to the value of current through the said conductor for magnetically holding the said contact mechanism in a position to select a portion of the said paths from the said conductor to be established when the initial current through the said conductor is a predetermined value and to magnetically operate the said switch mechanism to select another portion of said paths when the initial current through the said conductor is a different value.

4. The combination in a system of control of a supply conductor, electro-responsive switch mechanism for establishing a selected portion of a plurality of paths from the said conductor, means for limiting the value of current through the said conductor, and a series lockout type electro-responsive device connected to the said conductor and energized responsively to the value of current through the said conductor for selecting the portion of the said paths to be established from the said conductor by the said switch mechanism.

5. The combination in a system of control of a supply conductor, electro-responsive switch mechanism for establishing a selected portion of a plurality of paths from the said conductor, a series lockout type electro-responsive device connected to the said conductor and energized responsively to the value of current through the said conductor for controlling the said switch mechanism to select the said portion of the said paths to be established from the said conductor, and a controller having a plurality of successive operative positions for limiting the value of current through the said conductor in an initial position thereof to control the said electro-responsive selector device and to regulate the current through the said conductor after the said electro-responsive switch mechanism has established the selected portion of the said paths in other of the said positions of the said controller.

6. The combination in a system of control of a supply conductor, electro-responsive switch mechanism for establishing either one of two separate paths from the said conductor, a switch member biased to one position to energize the said switch mechanism from the said conductor to establish one of said paths, and electro-responsive means energized from the said conductor for magnetically holding the said switch member in the said position when the potential of the said conductor is above a predetermined value and for magnetically operating the said switch member to a second position to energize the said switch mechanism to establish the second path when the potential of the said conductor is below a predetermined value.

7. The combination in a selective system of control of a supply conductor, electro-responsive switch mechanism for establishing a selected portion of a plurality of separate paths from the said conductor, and an electro-responsive relay having a winding connected to the said conductor so as to be energized responsively to the potential of the conductor and a switch member operated under the control of the said winding for selecting the portion of the said paths from the said conductor to be established by the said switch mechanism, the arrangement being such that the said switch member is magnetically held in one position when the potential of the conductor is a predetermined value and magnetically operated to another position when the potential of the said conductor is a different value.

8. The combination in a selective system of control of a supply conductor, electro-responsive switch mechanism for establishing a selected portion of a plurality of separate paths from the said conductor, a series lockout type electro-responsive device connected to the said conductor and operated responsively to the potential of the conductor for selecting the portion of the said paths from the said conductor to be established by the said switch mechanism, a resistor for limiting the initial potential of the said conductor, a second resistor for governing the current through the selected portion of the said paths, and a controller having a plurality of successive operative positions for governing the first of said resistors in an initial position thereof to thereby control the said relay and for governing the said second resistor in other operative positions thereof.

9. The combination in a system of control of a supply conductor, a switch contact mechanism for selecting a predetermined portion of a plurality of paths for the current from said conductor, electroresponsive means connected to be energized from the said conductor for magnetically holding the said switch mechanism in a position to select a portion of the said paths when the initial potential of the said conductor is a predetermined value and for magnetically operating the said switch member to select another portion of the said paths when the initial potential of the said conductor is a different value, means for regulating the potential of the said conductor, and a controller having a plurality of operative positions for controlling the said means to vary the initial potential of the said conductor and to regulate the current in the path selected under the control of the said switch member.

10. A reversing control system for an electric motor comprising a supply conductor, electro-responsive reversing switch mechanism for connecting the motor to the said supply conductor for either the forward or reverse operation, an electro-responsive relay connected to the said conductor for controlling the said reversing switch mechanism, the said relay having means for operating the same responsively to the initial potential of the said conductor, a resistor for controlling the initial potential of the conductor, and a reversing controller for controlling the said resistor and for regulating the motor after the reversing switch mechanism is operated.

11. The combination in a system of control of a single supply conductor, a plurality of separately actuated electro-responsive switches for controlling separate paths from the said conductor, and means operated responsively to the initial drop of potential across the said switches for selectively controlling the energization of the said switches from the said supply conductor.

12. The combination in a system of control of a single supply conductor, a plurality of separately actuated normally open electro-responsive switches for controlling separate paths from the said conductor, and an electromagnetic relay having a winding normally connected to be energized from the said conductor for selectively controlling the energization of the said switches from the said conductor responsively to the initial potential of the said conductor.

13. The combination in a system of control of a single supply conductor, a pair of normally open separately actuated electromagnetic switches for controlling separate paths from the said conductor, a switch member biased to one position to energize one of said switches from the said conductor, and electromagnetic means energized from the said conductor for magnetically holding the said switch member in the said position when the potential of the said conductor is above a predetermined value and for magnetically operating the said switch member to a second position to energize the other electromagnetic switch when the potential of the said conductor is below a predetermined value.

14. The combination in a system of control of a single supply conductor, a plurality of separately actuated electro-responsive switches for controlling separate paths from the said conductor, means operated responsively to the initial drop of potential across the said switches for selectively controlling the energization of the said switches from the said supply conductor, and a controller for predetermining the initial potential drop across the said switches.

15. The combination in a system of control of a single supply conductor, a plurality of separately actuated electro-responsive switches for controlling separate paths from the said conductor, means operated responsively to the initial drop of potential across the said switches for selectively controlling the energization of the said switches from the said supply conductor, and a controller for predetermining the initial potential drop across the said switches and having means for regulating the current in the path closed by the energization of the particular switch thus selected.

16. The combination in a system of control of a single supply conductor, a plurality of separately actuated normally open electro-responsive switches for controlling separate paths from the said conductor, an electromagnetic relay having a winding normally connected to be energized from the said conductor for selectively controlling the energization of the said switches from the said conductor responsively to the initial potential of the said conductor, and a controller for predetermining the initial potential of the said conductor.

17. The combination in a system of control of a single supply conductor, a plurality of separately actuated normally open electro-responsive switches for controlling separate paths from the said conductor, an electromagnetic relay having a winding normally connected to be energized from the said conductor for selectively controlling the energization of the said switches from the said conductor responsively to the initial potential of the said conductor, and a controller for predetermining the initial potential of the said conductor and having means for regulating the current in the path closed by the energization of the particular switch thus selected.

18. The combination in a system of control of a supply conductor, means operated responsively to the potential of said conductor for controlling the selection of the desired portion of a plurality of paths to be established from said conductor, and electroresponsive means energized responsively to the current in the selected portion of the paths for maintaining closed the selected portion of the paths.

19. The combination in a system of control of a supply conductor, means operated responsively to the potential of said conductor for controlling the selection of the desired portion of a plurality of paths to be established from said conductor, switch mechanism controlled by the said means for establishing the portion of said paths selected, and electroresponsive means energized responsively to the current in the selected portion of the paths for holding the said switch mechanism closed.

20. The combination in a system of control of a supply conductor, means operated responsively to the potential of said conductor for controlling the selection of the desired portion of a plurality of paths to be established from said conductor, electroresponsive switch mechanism having a shunt operating winding controlled by said means for establishing the portion of said paths selected, and a series winding included in the portion of the paths selected for holding the said switch mechanism closed.

21. The combination in a system of control of a supply conductor, switch contact mechanism for selecting a desired portion of a plurality of paths for the current from said conductor, electroresponsive means connected to be energized from said conductor for magnetically holding the said contact mechanism in a position to select a portion of the said paths when the initial potential of the said conductors is a predetermined value and for magnetically operating the said mechanism to select another portion of the said paths when the initial potential of the conductor is a different value, and means energized responsively to the current in the portion of the paths selected for maintaining closed the selected portion of the paths.

22. The combination in a system of control of a supply conductor, switch contact mechanism for selecting a desired portion of a plurality of paths for the current from said conductor, electroresponsive means connected to be energized from said conductor for magnetically holding the said contact mechanism in a position to select a portion of the said paths when the initial potential of the said conductor is a predetermined value and for magnetically operating the said mechanism to select another portion of the said paths when the initial potential of the said conductor is a different value, electromagnetic switch mechanism having a shunt operating winding controlled by the said contact mechanism for establishing the portion of said paths selected, and a series winding included in the portion of the paths selected for holding the said electromagnetic switch mechanism closed.

23. A reversing control system for electric motors comprising a supply conductor, a controller, electro-responsive reversing switch mechanism for connecting the motor to the said supply conductor for either direction of operation, and means under the control of said controller and operated responsively to a value of current through the said conductor smaller than the motor operating current for controlling the energization of the said reversing switch mechanism.

24. A reversing control system for electric motors comprising a supply conductor, a controller, electro-responsive reversing switch mechanism for connecting the motor to the said conductor for either direction of operation, and an electro-responsive selector relay responsive to variations of the potential applied to said conductor and under the control of the said controller for controlling the said reversing switch mechanism to control the direction of motor operation.

25. A reversing control system for electric motors comprising a motor supply conductor, a reversing controller for closing a gap in the said conductor and for controlling the potential of the said supply conductor, electro-responsive motor reversing switch mechanism, and a selector relay operated responsively to the potential of the supply conductor for controlling the said switch mechanism.

26. A reversing control system for electric motors comprising a motor supply conductor, a resistor, a reversing controller operable in one direction from an off position to connect the said conductor to a source of supply through the said resistor and operable in the other direction to connect the supply conductor to the source of supply with the said resistor excluded, electro-responsive motor reversing switch mechanism, and an electro-responsive selector relay operated responsively to the inclusion of the said resistor in circuit with the said supply conductor for controlling the said reversing switch mechanism.

27. A reversing control system for electric motors comprising a supply conductor, a controller, electroresponsive reversing switch mechanism for connecting the motor to the said supply conductor for either direction of operation, means under the control of said controller and operated responsively to a value of current through the said conductor smaller than the motor operating current for controlling the energization of the said reversing switch mechanism, and electroresponsive means energized responsively to the current taken by the motor for maintaining the said reversing switch mechanism closed for the desired direction of motor operation.

In witness whereof, I have hereunto set my hand this 3rd day of January, 1922.

JOHN EATON.